(12) United States Patent
Husby

(10) Patent No.: US 6,230,088 B1
(45) Date of Patent: May 8, 2001

(54) ASSEMBLY OF SEAT BELT BUCKLE AND SEAT BELT TENSION SENSOR

(75) Inventor: Harald Snorre Husby, Lakeland, FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/549,678

(22) Filed: Apr. 14, 2000

Related U.S. Application Data (63) Continuation-in-part of application No. 09/065,497, filed on Apr. 24, 1998, now Pat. No. 6,081,759.

(51) Int. Cl.[7] .................................................. B60R 22/00
(52) U.S. Cl. .......................... 701/45; 280/801.1; 24/303
(58) Field of Search ........................... 701/45; 280/801.1, 280/804, 805, 806, 808; 324/200, 207.13, 207.21; 24/303, 642

(56) References Cited

U.S. PATENT DOCUMENTS

| | | | |
|---|---|---|---|
| 4,943,087 | 7/1990 | Sasaki | 280/804 |
| 5,060,977 | 10/1991 | Saito | 280/802 |
| 5,309,135 | 5/1994 | Langford | 338/211 |
| 5,454,591 | 10/1995 | Mazur et al. | 280/735 |
| 5,494,311 | 2/1996 | Blackburn et al. | 280/735 |
| 5,570,903 | 11/1996 | Meister et al. | 280/735 |
| 5,583,476 | 12/1996 | Langford | 338/211 |
| 5,996,421 | * 12/1999 | Husby | 73/862.451 |
| 6,081,759 | 6/2000 | Husby et al. | 701/45 |

* cited by examiner

*Primary Examiner*—Tan Nguyen
(74) *Attorney, Agent, or Firm*—Lonnie Drayer (57) ABSTRACT

A seat belt tension sensing device has a seat belt tension sensor and a seat belt buckle. The seat belt tension sensor has a means for detecting and transmitting information about magnetic field strength, a magnet, and a means for positioning the magnet spaced from the sensor. The magnet is biased away from the sensor. The seat belt tension sensor maintained fixed relative to a structural member of a vehicle. The a seat belt buckle is attached directly or indirectly to the seat belt tension sensor so that tension on the seat belt buckle moves the magnet and sensor closer together or further apart.

29 Claims, 7 Drawing Sheets

FIG. 8 ated by a tensioned seat belt. In this way the weight of
ASSEMBLY OF SEAT BELT BUCKLE AND SEAT BELT TENSION SENSOR This is a continuation-in-part of application Ser. No. 09/065,497 filed Apr. 24, 1998 which is now U.S. Pat. No. 6,081,759.

FIELD OF THE INVENTION

The present invention relates to assemblies in which seat belt buckles cooperate with sensors used to determine when and how vehicle occupant protection devices should be deployed.

BACKGROUND OF THE INVENTION

Airbags were developed to protect occupants of cars during vehicle crashes. Originally airbags were viewed as an alternative to seat belts, because they are passive devices which do not require the cooperation of the vehicle's occupants to be effective. However, experience has shown that airbags should be considered an adjunct to seat belts. When used properly, airbags can in certain crash situations reduce injuries to occupants. An airbag is a gas-filled bag that is rapidly deployed in the event of a vehicle crash. When appropriate sensors determine that a crash situation has occurred, the airbag is rapidly inflated to create an impact cushion between an occupant of a vehicle and the structure of the vehicle. Consideration is also being given to the design of airbags that better position the vehicle occupant to withstand crash-induced accelerations.

An airbag system is made up of two basic functional components: an airbag module, including the means for deploying the airbag; and the sensors and circuitry which determine whether the airbag should be deployed.

Recently sensors have been developed to determine the weight imposed on the front seat. The value of the determined weight may then be used as input into the system logic that determines whether or not an airbag should be deployed. Furthermore, the value of the determined weight may be used as input into system logic which determines or whether the mode of deployment should be modified in airbag systems which are capable of varying the deployment sequence to accommodate varying circumstances. In some cases, however, these weight sensors can be confused by loads imposed by the compression of the seat resulting from installing a child's car seat and tensioning the seat belt to hold the child seat into place.

One proposed solution is to place a device on each child seat that can be detected by a sensor and thus used to determine the presence of a child seat. However, this approach relies on gaining cooperation of all manufacturers of child car seats and would take many years before all old child car seats have been replaced with child car seats containing the needed sensor.

What is needed is a device comprising a seat belt buckle and a sensor that can provide data for determining whether a child's seat is positioned in the front passenger seat of an automobile.

Pretensioners are used to take up the slack in a seat belt in the event of a crash. However, if there is no significant slack in a seat belt because the user has drawn the seat belt exceptionally tightly around him or has already taken up the slack by his forward movement as a result of a crash it may not be desirable to activate the pretensioner. What is needed is a device comprising a seat belt buckle and a sensor that can provide data for determining whether it is necessary to activate a pretensioner associated with the seat belt system.

SUMMARY OF THE INVENTION

The devices according to the present invention include a sensor that measures seat belt tension. Seat belt tension is by itself indicative of the presence of a child car seat because proper installation of a car seat involves tightening the car seat belt as tight as possible to snugly hold the car seat in place. Thus a passenger will be uncomfortable with much less seat belt tension than a child seat will normally be installed with. When used in combination with a seat occupant weight sensor the assembly of a seat belt buckle and seat belt tension sensor allows direct determination of the actual weight of the seat occupant corrected for any loads imposed by a tensioned seat belt. In this way the weight of the seat occupant can be used with greater confidence to decide when and how an airbag should be deployed.

The seat belt tension sensor used in the assembly of this invention preferably employs a magnetic field sensor, preferably a magneto-resistive sensor of the Giant Magneto-Resistive (GMR) type. The sensor is attached to an anchor bracket or to a cable that is a part of a seat belt pretensioner. In one embodiment a loop portion of a base plate of a seat belt buckle passes through an opening in the sensor while the sensor is secured to a cable that is part of the pretensioner. A magnet positioned on a sliding carriage is biased away from a sensing element by springs. The loop extends around the carriage, and tension from the seat belt causes the carriage with the magnet to be drawn against the springs toward the magnetic field sensor.

The magnetic field sensor measures the magnetic field present at the sensor and a microprocessor determines belt tension based on the known spring constants and the strength of the measured magnetic field that is a function of displacement of the magnet. Thus the sensed magnetic field is directly proportional to carriage displacement, carriage displacement is proportional to spring compression force based on a spring constant, and belt tension is equal to the determined compression force of the springs.

There is provided in accordance with the present invention to provide a vehicle occupant protection device deployment system that incorporates seat belt tension as one factor used by the system deployment logic.

Further features and advantages of the invention will be apparent from the following detailed description when taken in conjunction with the accompanying drawings.

DETAILED DESCRIPTION OF THE INVENTION

Figure 1:
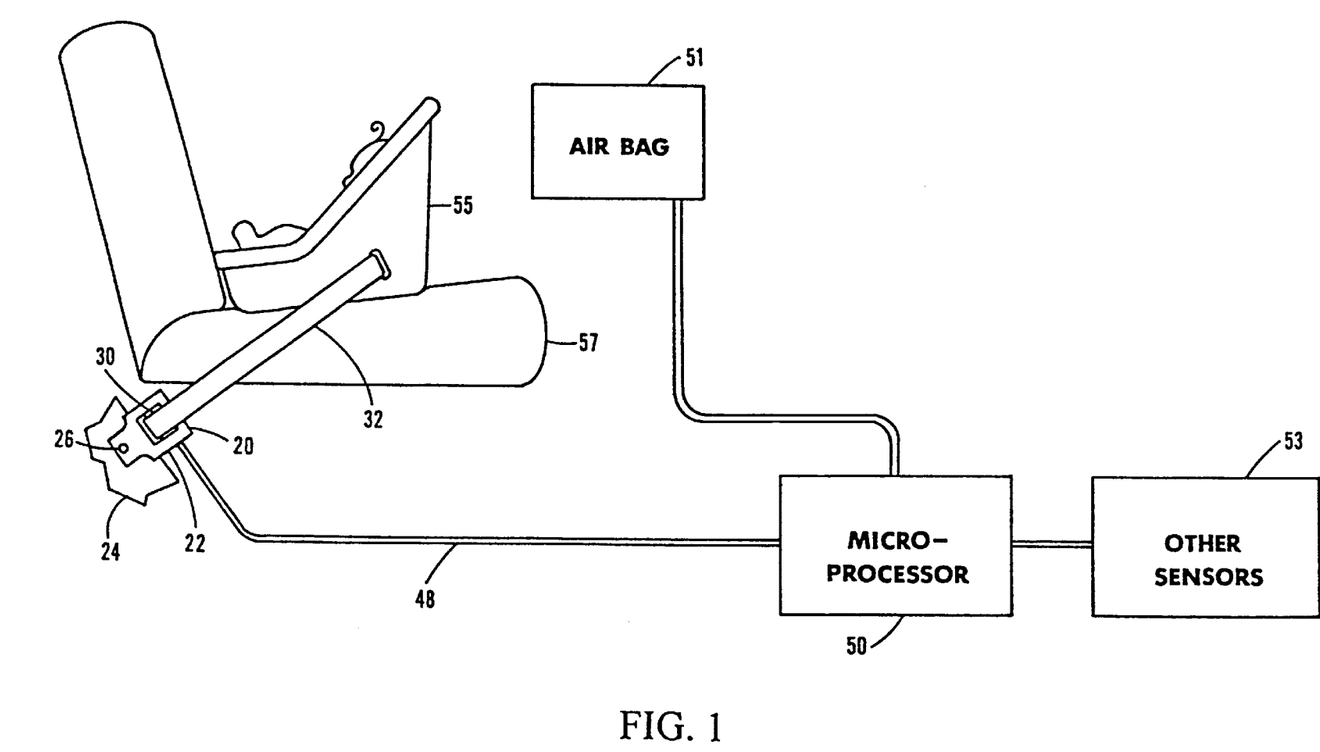
FIG. 1 is an schematic representation of a child car seat installed in a vehicle together with the seat belt tension sensor of this invention and a schematic of the airbag and airbag deployment system.
Figure 2:
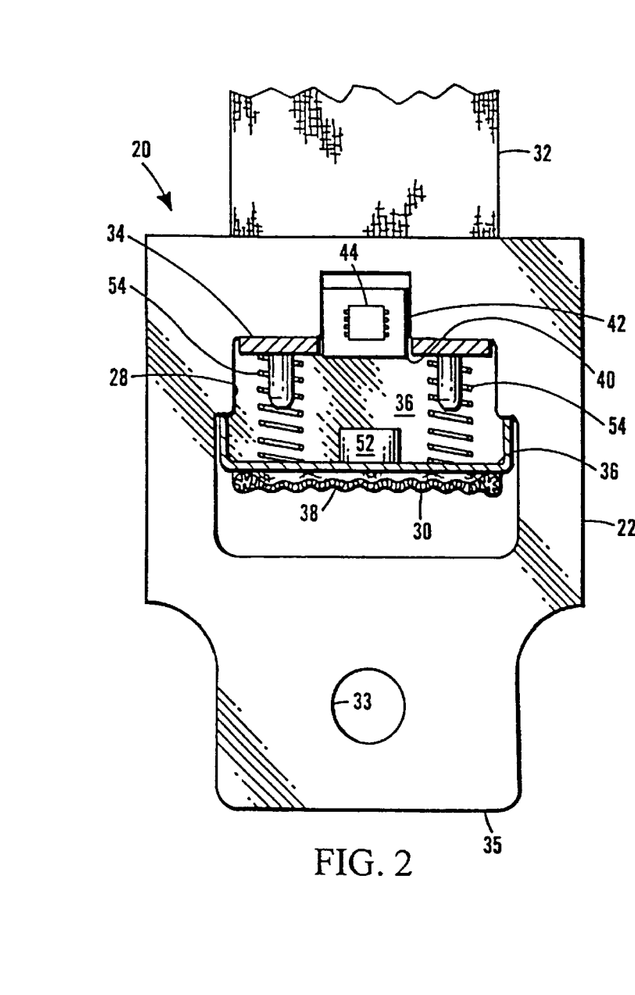
FIG. 2 is a front elevation view, partially broken away in cross-section, of the seat belt tension sensor of FIG. 1.
Figure 3:
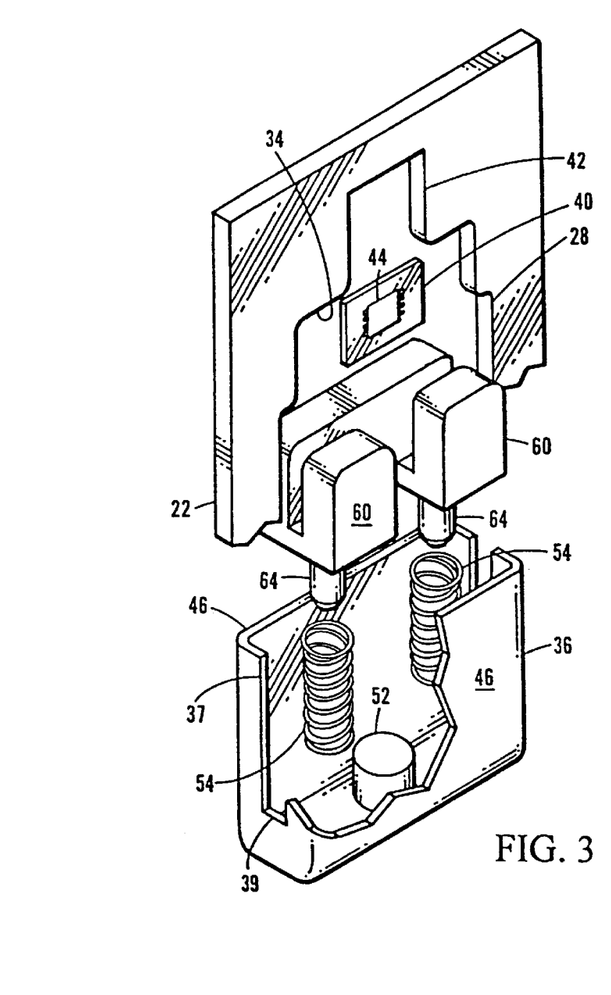
FIG. 3 is an exploded isometric view, partially broken away in section, of the seat belt tension sensor of FIG. 1.

Referring to FIGS. 1–3 wherein like numbers refer to similar parts, a seat belt tension sensor 20 is fixed to a seat belt anchor bracket 22. As best shown in FIG. 1, the anchor bracket 22 is mounted to a structural component 24 of a vehicle by a bolt 26. The anchor bracket 22, as shown in FIG. 2, has an opening 28 through which a loop 30 of seat belt 32 passes. A hole 33 is formed in the lower portion 35 of the anchor bracket 22 through which the bolt 26 passes.

The seat belt loop 30 connects the seat belt 32 to the anchor bracket 22. When tension is applied to the seat belt 32 the loop 30 is pulled toward the top side 34, or seat belt restraining side, of the opening 28 in the anchor bracket 22. As shown in FIGS. 2 and 3, a sliding carriage 36 is positioned between the bottom 38 of the belt loop 30 and the top side 34 of the opening 28. The carriage 36 sides 46 have inwardly-turned edges 37 which guide the motion of the carriage 36 along the bracket 22. Reduced height end wall stops 39 are formed between the edges 37. The stops 39 serve to limit travel of the carriage 36. A circuit board 40 is mounted in a rectangular notch 42 in the top side 34 of the bracket 22. The circuit board 40 contains an integrated circuit chip 44 that incorporates a magnetic field sensor, preferably a GMR sensor.

As shown in FIG. 1, the sensor within the integrated circuit chip 44 is connected by wire leads 48 to a microprocessor 50. The microprocessor is connected to an airbag 51 and other sensors 53. The airbag 51 is positioned with respect to a particular passenger seat 57 on which a passenger or a child car seat 55 is restrained by the seat belt 32. The decision to deploy an airbag is made by the microprocessor 50. The deployment decision is based on logic that considers the acceleration of a crash as detected by one or more crash sensors. Other criteria can include crash severity and data indicative of whether the front seat is occupied by a passenger who would benefit from the deployment of the airbag 51. Sensors that determine the weight of the occupant, the size of the occupant and the location of the seat have been developed. The seat belt tension sensor 20 supplies an important piece of information which can be considered by the microprocessor logic alone or with other data to reach a conclusion about the desirability of employing an airbag in a particular situation.

As shown in FIG. 3, the magnetic field sensor in the chip 44 responds to a magnet 52 which is affixed to the bottom of the U-shaped sliding carriage 36. When tension is applied to the seat belt 32 it draws the carriage 36 against springs 54 toward the top side 34 of the opening 28 where the magnetic field sensor on the chip 44 is mounted. The magnetic field sensor responds to the intensity of the magnetic field that reaches the sensor on the chip 44. The sensor has a response that varies as belt tension draws the carriage 36 and the magnet 52 toward the magnetic field sensor on the chip 44. The magnetic field present at the magnetic field sensor is thus correlated with belt tension by the microprocessor 50.

The magnetic field sensor is preferably a GMR sensor that utilize an effect discovered in 1988, in which certain thin film devices are able to detect static magnetic fields. GMR sensors utilize resistors built up of thin magnetic film a few nanometers thick separated by equally thin nonmagnetic layers. A decrease in resistance of between about 10 and 20 percent in the built-up resistors is observed when a magnetic field is applied. The physical explanation for the decrease in resistance is the spin dependence of electron scattering and the spin polarization of conduction electrons in ferromagnetic metals.

The extremely thin adjacent magnetic layers couple antiferromagnetically to each other so that the magnetic moments of each magnetic layer are aligned antiparallel to adjacent magnetic layers. Electrons, spin polarized in one magnetic layer, are likely to be scattered as they move between adjacent layers. Frequent scattering results in high resistance. An external magnetic field overcomes the antiferromagnetic coupling and produces parallel alignment of moments in adjacent ferromagnetic layers. This decreases scattering and thus device resistance.

In an exemplary sensor a group of four resistors based on the GMR technology are arranged in a Wheatstone bridge and two legs of the bridge are shielded from the applied magnetic fields. The other two legs are positioned between the magnetic shields. The magnetic shields act as flux concentrators to produce a device of tailored sensitivity to a magnetic flux of a selected intensity. A regulated voltage or current is supplied to the resistor network and the variation in current or voltage is measured and correlated with magnetic field strength.

As an alternative the resistance of one or more GMR resistors may be measured directly by an ohmmeter incorporated in the microprocessor. The sensor can be designed to have an axis of sensitivity that is produced by the orientation of the magnetic flux shields within the chip 44. The axis of sensitivity in the sensor is aligned with the direction of motion of the carriage 36.

GMR sensors are available from Nonvolatile Electronics Inc. of 11409 Valley View Rd., Eden Prairie, Minn. (www.nve.com). GMR sensors are small, highly sensitive devices that have exceptional temperature stability, deliver high signal levels and require very little power and cost less than many competitive devices. All these factors are important in devices used in automobile safety applications.

The carriage 36 not only supports tension loads when the seat belt 32 is tightened but also supports any crash-induced loads. Because crash loads are very large, the spring guides 60 are constructed of metal, preferably high strength steel. The spring guides 60 may be riveted or force fit onto the anchor bracket 22. The spring guides 60 have guideposts 64 about which the coil springs 54 are positioned. Typical tension forces sensed are in the range of about twenty to about forty pounds. Tensions in this range are sufficient to differentiate between a child's car seat or other object and a person and if a seat belt retraining a person has sufficient slack to require the activation of a pretensioner. The carriage 36 is constructed of high strength steel both to absorb the loads in a crash and so that the sides 46 of the carriage 36 shield the magnetic field sensor from stray magnetic fields.

It should be understood that the springs can be of various designs including Belleville Springs, gas springs, and springs using other shapes and configurations.

It should be understood that although a sensor based on GMR technology is described, other types of magnetic field sensors such as Hall sensors and other solid state sensors as exist or may be developed could be used. In addition a simple reed switch, which is a type of magnetic field sensor, could provide binary or stepped information concerning displacement of a magnet.

It should also be understood that although a GMR sensor can be used with a reference voltage or current, the change in resistance of one or more GMR resistors can be determined directly with a circuit which functions as an ohmmeter.

If the GMR sensor is used with voltage or current where the GMR sensor is an active part of a Wheatstone bridge, four wires are normally required. If the GMR sensor is used simply as a simple resistor, two wires are sufficient.

It should also be understood that other types of magnetic field sensors could be employed to detect the motion of the carriage 36 toward the sensor.

While the seat belt tension sensors disclosed thus far have been described as cooperating with the belt portion of a seat belt that is looped through the sensor, it is also desirable to provide seat belt tension sensing device wherein a seat belt buckle is attached directly or indirectly to the seat belt tension sensor so that tension on the seat belt buckle moves the means for detecting and transmitting information about magnetic field strength 44 and the magnet 52 closer together or further apart.

Figure 8:
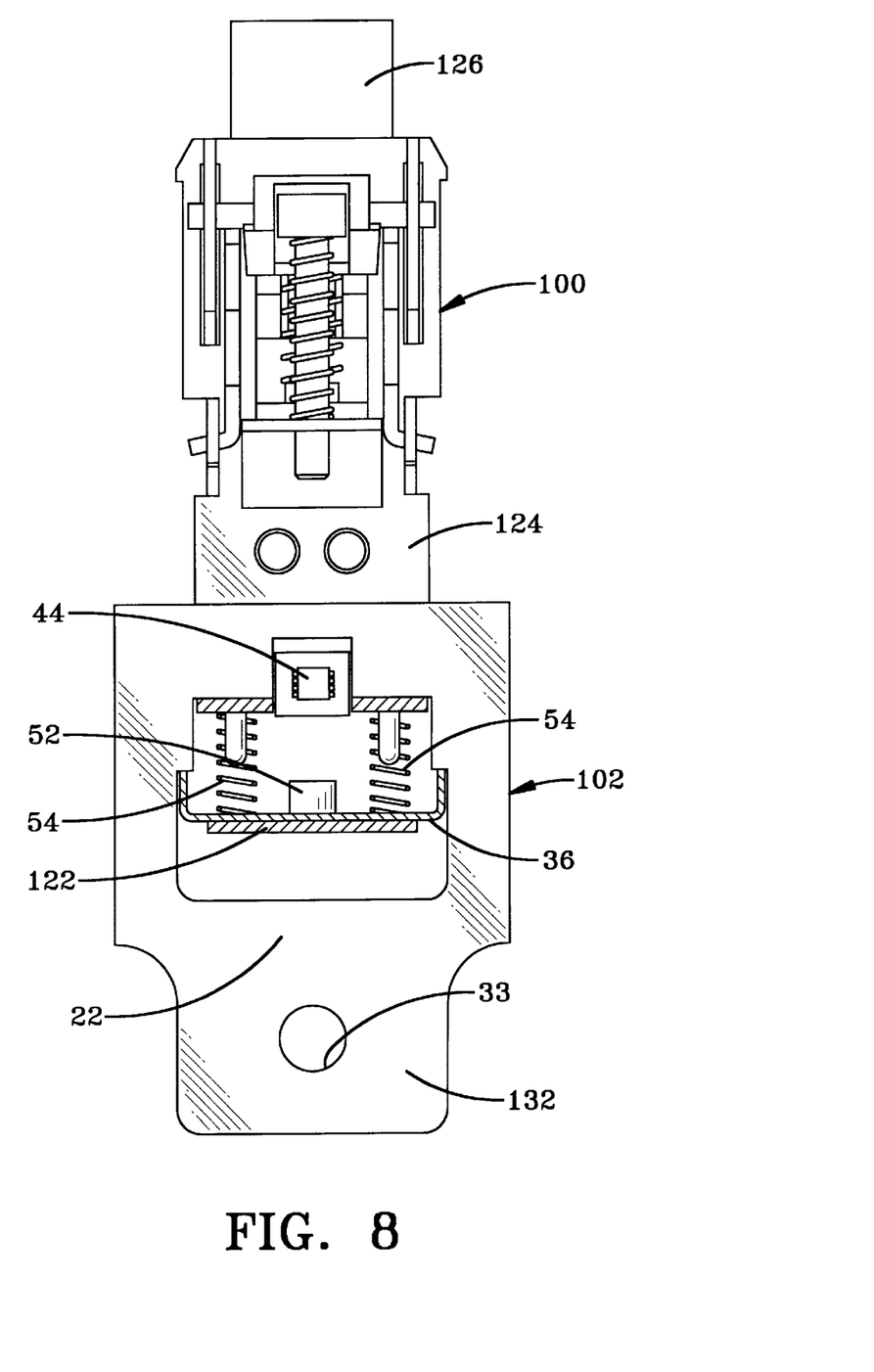
FIG. 8 shows the seat belt tension sensor of FIG. 2 assembled with a seat belt buckle as employed without a pretensioner.

With reference to FIG. 8 there is shown a seat belt buckle 100 have a component 124 that is formed into a loop 122 which extends through the opening in the bracket 22 of the seat belt tension sensor 102 in substantially the same manner as the set belt did in the embodiment shown in FIG. 2. The bracket may be attached directly or indirectly to a structural member of a vehicle for example using a bolt (not shown) passing through a hole 33 in the bracket.

When a seat belt (not shown) is connected to the buckle 100 using a buckle tongue 126 tension on the seat belt buckle cause the loop 122 to be pulled toward the top side, or seat belt buckle restraining side of the opening in the anchor bracket 22 in the manner already described above with regards to FIGS. 2 and 3. The structure of the seat belt tension sensor, such as the sensor 44, magnet 52, springs 54 and carriage 36 are substantially is substantially the same as that already described above with regards to FIGS. 2 and 3. The sensor is in circuit communication with a microprocessor as already described above. Such a seat belt tension sensing device has utility when a vehicle manufacturer wishes to locate a seat belt tension sensor on the "buckle side" of a seat belt system.

While the seat belt buckle is shown attached to the seat belt sensor by a loop, it is understood that in seat belt tension sensing devices of the present invention the seat belt buckle may be attached directly or indirectly to the seat belt tension sensor using any suitable attachment means so that tension on the seat belt buckle moves the magnet and sensor closer together or further apart including welding, brazing, rivets, threaded fasteners, clamping, twisting, interference fits, interlocking parts and so forth.

There is an increasing use in vehicle of pretensioners to take up slack in seat belts in the event of a crash. In some instances, for instance for space availability considerations, a vehicle manufacturer may desire to have a seat belt tension sensor located on the "buckle side" of a seat belt system that is equipped with a buckle side seat belt pretensioner.

The present invention provides the vehicle manufacturer with a solution that can be described with reference to FIGS. 4 to 7. Seat belt pretensioners located on the "buckle side" of a seat belt system are well known in the art. A typical buckle pretensioner 104 has a cylinder 106 containing a piston that is driven by a pyrotechnic device 108 in a direction away from the seat belt buckle 100. The piston is connected to the seat belt buckle using a metallic cable 114. The pretensioner is attached directly or indirectly to a structural member of a vehicle using a fastener (not shown) passing through a hole 112 in a mounting bracket/cable guide 110. The cable is very strong and stiff, and does not move in a lengthwise direction unless the pyrotechnic device activates the pretensioner.

Figure 4:
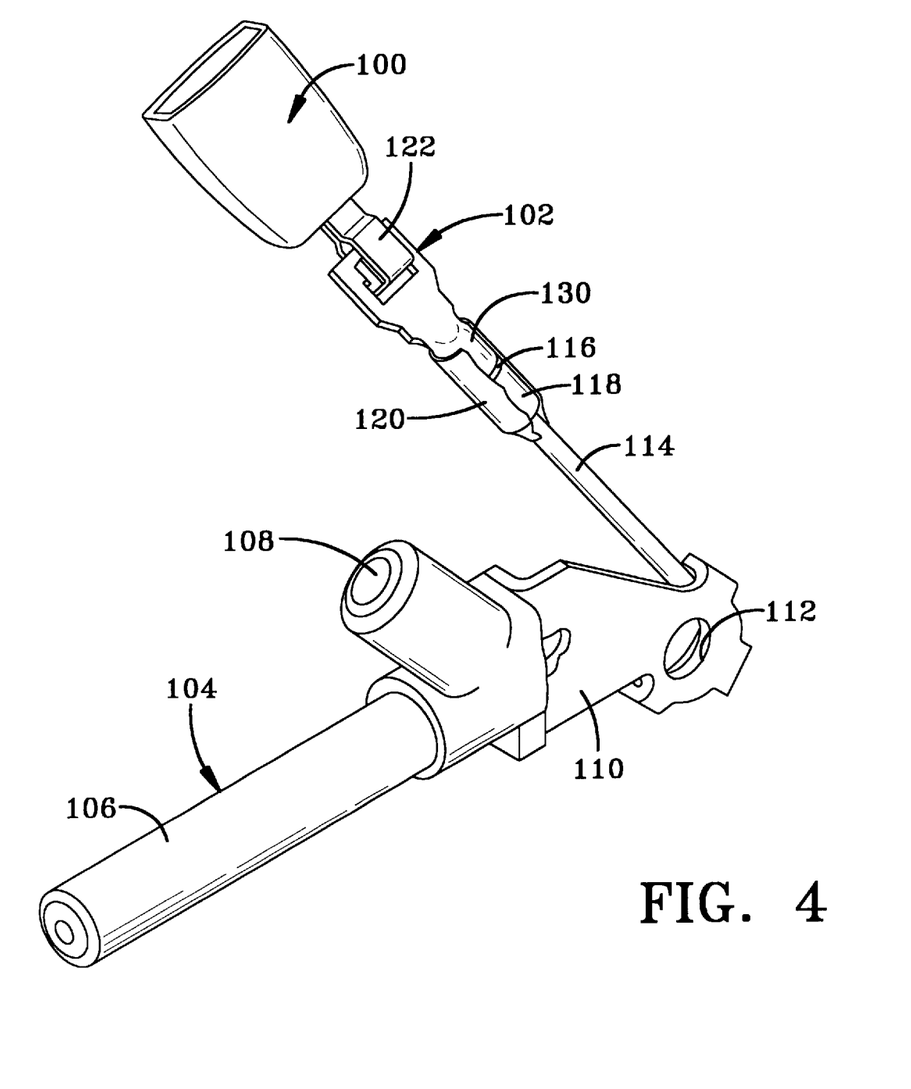
FIG. 4 is a pictorial view of a first embodiment of an assembly of a seat belt buckle and a seat belt tension sensor in conjunction with a seat belt pretensioner.
Figure 5:
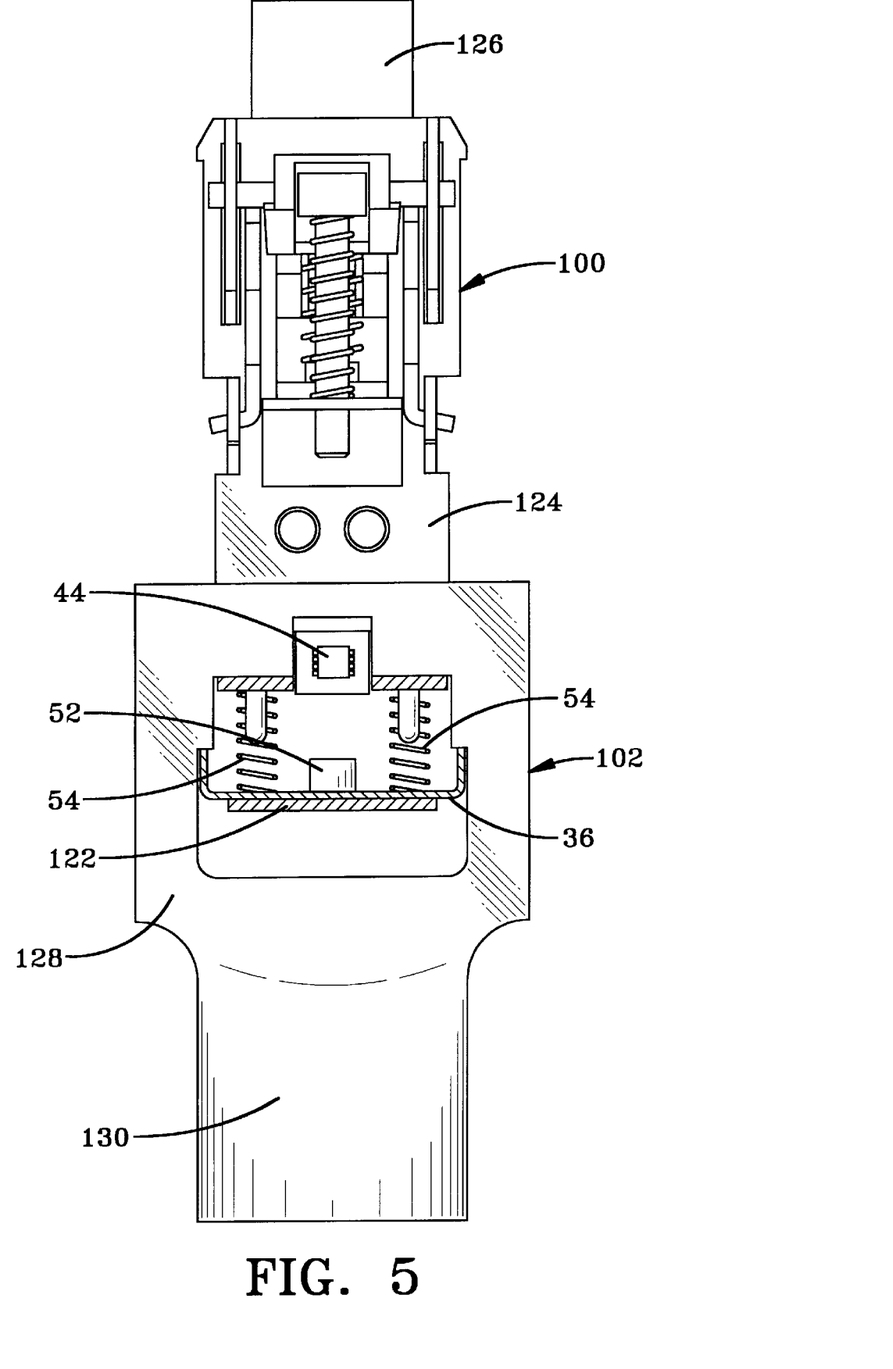
FIG. 5 shows the seat belt tension sensor of FIG. 2 assembled with a seat belt buckle as employed in the embodiment of FIG. 4.

Referring now to FIGS. 4 and 5 there is shown a seat belt buckle 100 (shown in FIG. 4 in a typical housing) attached to a seat belt tension sensor 102 in the madder already described above with regards to FIG. 8. In a seat belt tension sensing device having a seat belt pretensioner as a component of the device the seat belt tension sensor may be located in a number of places with respect to the pretensioner. In the embodiment shown in FIGS. 4 and 5 the seat belt tension sensor 102 is attached to the cable 114 that is a component of the pretensioner. An extension 130 of the bracket 128 is formed into a cylinder like shape to facilitate attachment to the cable. In this example the seat belt tension sensor is attached to the cable using a washer 116 and a damper 118 which are encased in a crimping sleeve 120 along with the cylindrical like extension 130 of the bracket 128 of the seat belt tension sensor. It is understood that any suitable means may be used for attaching the seat belt tension sensor to the cable may be employed, such as welding, a loop through an opening in the sensor, and so forth may be used in the practice of this invention. In the embodiment shown in FIGS. 4 and 5 the seat belt buckle 100 is attached to the seat belt tension sensor using a loop 122 in the manner already described above with regards to FIG. 8.

The cable 114 of the pretensioner is typically a very strong stiff cable such that the bracket 128 of the seat belt tension sensor 102 is indirectly anchored to, and fixed relative to, a structural member of a vehicle. Tension in a seat belt (not shown) attached to the buckle 100 via a buckle tongue 126 is sensed by the sensor 144 as the magnet 52 is moved towards or away from the sensor in the manner already described above.

Figure 6:
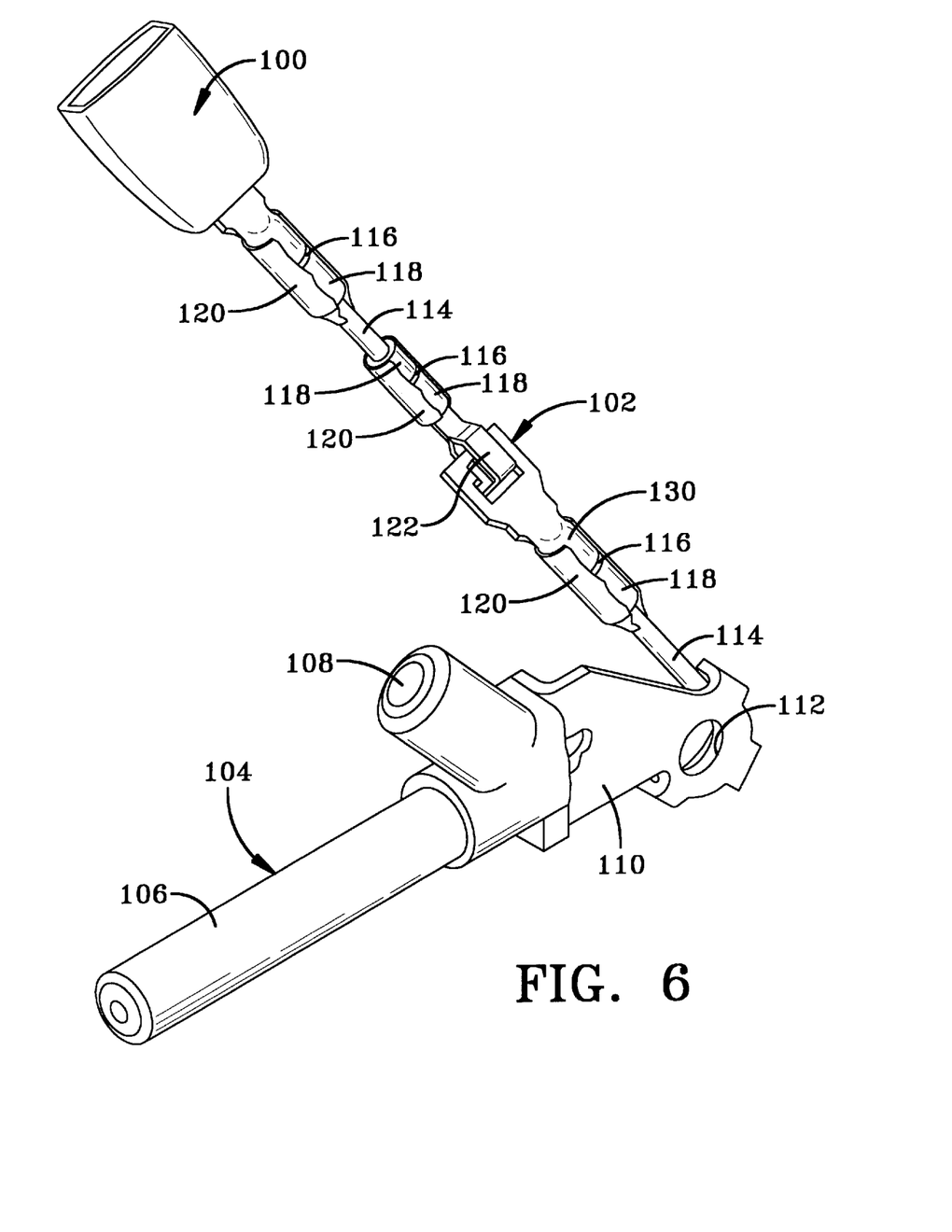
FIG. 6 is a pictorial view of a second embodiment of an assembly of a seat belt buckle and a seat belt tension sensor in conjunction with a seat belt pretensioner.

In the embodiment shown in FIG. 6 the seat belt buckle 100 is indirectly attached to the seat belt tension sensor 102 using a length of cable and the seat belt tension sensor is attached to a cable 114 that is a component of the seat belt pretensioner 104. In this example the loop 122 which acts upon the carriage 36 of the pretensioner is not attached directly to the buckle, but it still will move due to tension placed on the buckle, thus causing the magnet to move towards the sensor.

Figure 7:
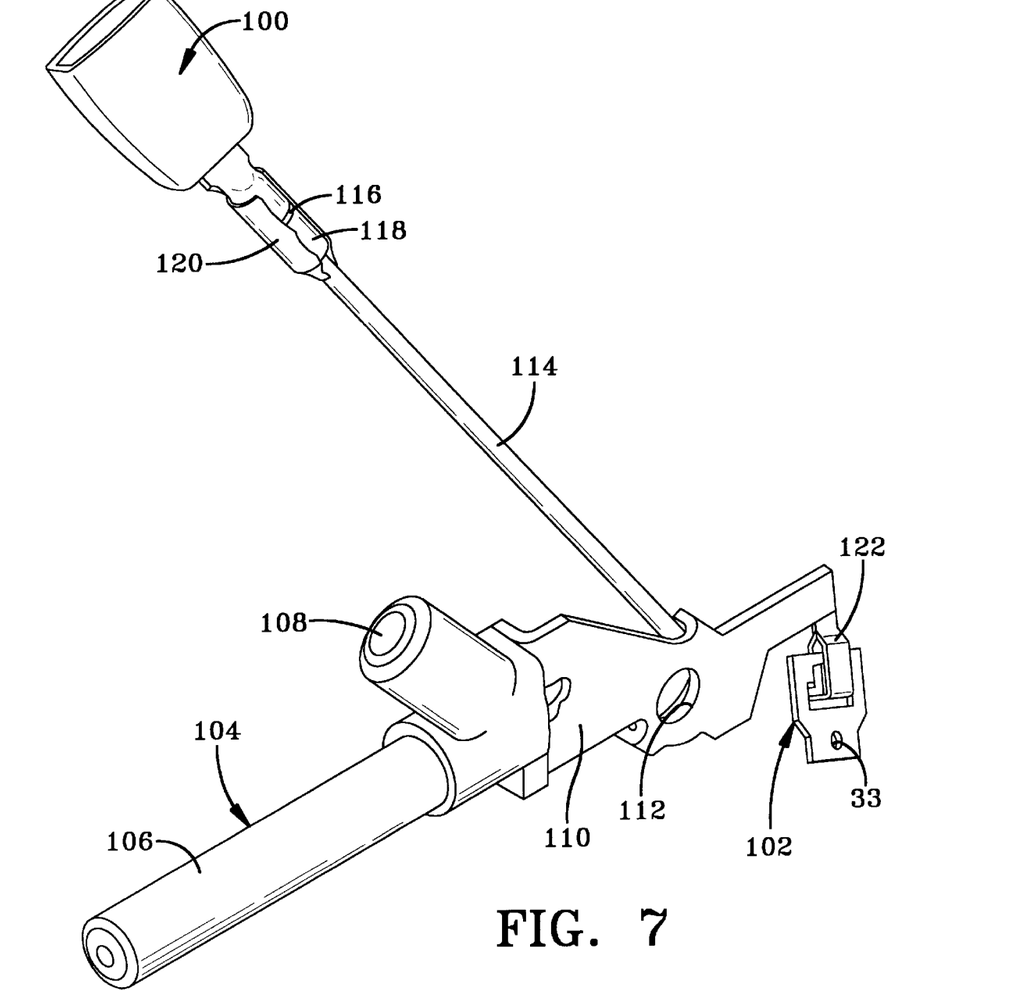
FIG. 7 is a pictorial view of a third embodiment of an assembly of a seat belt buckle and a seat belt tension sensor in conjunction with a seat belt pretensioner.

In the embodiment shown in FIG. 7 the pretensioner 104 is attached to the vehicle such that it may pivot through some preselected arc about a pin or threaded fastener that extends through the hole 112 in the mounting bracket/cable guide 110. The seat belt tension sensor 102 is fixed relative to a structural member of the vehicle using a fastener extending through a hole 33 in the bracket. Tension on the seat belt buckle 100 pulls on the cable 114 causing the pretensioner to pivot and tension is transferred to the sensor via a loop 122 that connects the seat belt tension sensor to the pretensioner. That is to say in the embodiment the buckle is connected indirectly to the seat belt tension sensor via the pretensioner.

Pretensioners are used to take up the slack in a seat belt in the event of a crash. However, if there is no significant slack in a seat belt because the user has drawn the seat belt exceptionally tightly around him or has already taken up the slack by his forward movement as a result of a crash it may not be desirable to activate the pretensioner. The seat belt tension sensing device of the present invention can provide data for determining whether it is necessary to activate a pretensioner associated with the seat belt system. A microprocessor can be connected by wire to the means for detecting and transmitting information about magnetic field strength (the sensor), and the microprocessor and determine if the pretensioner should be activated based upon the sensed seat belt tension. That is to say in addition to determining the presence of a child seat as a variable in determining how to activate vehicle occupant safety devices the microprocessor can use seat belt tension as a variable in determining if a pretensioner should be activated.

It is understood that the invention is not limited to the particular construction and arrangement of parts herein illustrated and described, but embraces such modified forms thereof as come within the scope of the following claims.

What is claimed is:

1. A seat belt tension sensing device comprising:
   (a) a seat belt tension sensor comprising
      (i) a bracket adapted to be anchored directly or indirectly to a structural member of a vehicle, the bracket having portions defining an opening through which a component of a seat belt buckle is looped, wherein the bracket has a seat belt buckle restraining side;
      (ii) a carriage positioned within the bracket opening and movable toward the seat belt buckle restraining side;
      (iii) a magnetic field sensor mounted on the seat belt buckle restraining side of the bracket;
      (iv) a magnet mounted on the carriage for motion toward the sensor mounted on the seat belt buckle restraining side; and
      (V) at least one spring positioned between the carriage and the restraining side, biasing the carriage away from the restraining side, wherein the carriage moves toward the restraining side when tension is applied to the seat belt buckle; and
   (b) a seat belt buckle having a loop member that extends through said opening in said bracket of said seat belt tension sensor.

2. The seat belt tension sensing device of claim 1 wherein the magnetic field sensor is of the type producing a continuously changing state as an applied magnetic field varies.

3. The seat belt tension sensing device of claim 1 wherein the sensor is of the GMR type.

4. The seat belt tension sensing device of claim 1 wherein the sensor is of the Hall effect type.

5. The seat belt tension sensing device of claim 1 wherein the sensor is of the reed switch type.

6. The seat belt tension sensing device of claim 1 wherein the magnet is positioned opposite the sensor and further comprising a pair of spring guides positioned on either side of the magnet, and springs mounted on the guides, the guides extending from the bracket toward the carriage, the guides positioned to limit the movement of the carriage toward the restraining side.

7. The seat belt tension sensing device of claim 1 wherein the carriage is U-shaped having a U bottom on which the magnet is mounted and upstanding sides which shield the magnet and the sensor from magnetic fields other than the field produced by the magnet.

8. The seat belt tension sensing device of any one of claims 1 through 7 wherein the seat belt tension sensor is attached to a seat belt pretensioner which is adapted to be attached directly or indirectly to a structural member of a vehicle.

9. A seat belt tension sensing device comprising:
   (a) a seat belt tension sensor comprising
      (i) a bracket adapted to be held fixed relative to a structural member of a vehicle;
      (ii) a magnetic field sensor mounted on the bracket;
      (iii) a carriage mounted on the bracket for movement toward and away from the sensor;
      (iv) a means for biasing the carriage away from the bracket; and
      (v) a magnet mounted on the carriage so that motion of the carriage against the means for biasing moves the magnet toward the sensor; and
   (b) a seat belt buckle attached directly or indirectly to said carriage such that tension on the seat belt buckle causes the carriage to move toward and away from the sensor.

10. The seat belt tension sensing device of claim 9 wherein the magnetic field sensor is of the type producing a continuously changing state as an applied magnetic field varies.

11. The seat belt tension sensing device of claim 9 wherein the sensor is of the GMR type.

12. The seat belt tension sensing device of claim 9 wherein the sensor is of the Hall effect type.

13. The seat belt tension sensing device of claim 9 wherein the sensor is of the reed switch type.

14. The seat belt tension sensing device of claim 9 wherein the magnet is positioned opposite the sensor and further comprising a pair of guides positioned on either side of the magnet, and wherein the means for biasing includes springs mounted on the guides, the guides extending from the bracket toward the carriage, the guides positioned to limit the movement of the carriage toward the retaining portion of the bracket.

15. The seat belt tension sensing device of claim 9 wherein the carriage is U-shaped having a U bottom on which the magnet is mounted and upstanding sides which shield the magnet and the sensor from magnetic fields other than the field produced by the magnet.

16. The seat belt tension sensing device of any one of claims 9 to 15 further comprising a seat belt pretensioner which is adapted to be attached directly or indirectly to a structural member of a vehicle and the seat belt pretensioner is attached to said seat belt tension sensor.

17. The seat belt tension sensing device of claim 16 wherein the seat belt buckle is attached to the seat belt tension sensor using a length of cable and the seat belt tension sensor is attached to a cable that is a component of the seat belt pretensioner.

18. The seat belt tension sensing device of any one of claims 9 to 15 further comprising a seat belt pretensioner which is adapted to be attached directly or indirectly to a structural member of a vehicle, the seat belt buckle being attached to a cable that is a component of the seat belt pretensioner and the seat belt tension sensor being attached to a component of the seat belt pretensioner other than said cable.

19. A seat belt tension sensing device comprising:
   (a) a seat belt tension sensor comprising
      (i) a means for detecting and transmitting information about magnetic field strength;
      (ii) a magnet;
      (iii) a means for positioning the magnet spaced from the sensor;
      (iv) a means for biasing the magnet away from the sensor; and
      (v) a means for maintaining the seat belt tension sensor fixed relative to a structural member of a vehicle; and
   (b) a seat belt buckle attached directly or indirectly to said seat belt tension sensor so that tension on the seat belt buckle moves the means for detecting and transmitting information about magnetic field strength and the magnet closer together or further apart.

20. The seat belt tension sensor of claim 19 wherein the means for detecting and transmitting information about magnetic field strength is of the type producing a continuously changing state as an applied magnetic field varies.

21. The seat belt tension sensing device of claim 19 wherein the means for detecting and transmitting information about magnetic field strength is a GMR sensor.

22. The seat belt tension sensing device of claim 19 wherein the means for detecting and transmitting information about magnetic field strength is a Hall effect sensor.

23. The seat belt tension sensing device of claim 19 wherein the means for detecting and transmitting information about magnetic field strength is a reed switch.

24. The seat belt tension sensing device of claim 19 wherein the magnet is positioned opposite the sensor and further comprising a pair of guides positioned on either side of the magnet, and wherein the means for biasing includes springs mounted on the guides, the guides extending from the means for detecting and transmitting information about magnetic field strength toward the means for positioning the magnet spaced from the sensor, the guides positioned to limit the movement of the carriage toward the restraining side.

25. The seat belt tension sensing device of claim 19 wherein the means for positioning the magnet spaced from the sensor is a carriage having a U-shape and having a U bottom on which the magnet is mounted and upstanding sides which shield the magnet and the means for detecting and transmitting information about magnetic field strength from magnetic fields other than the field produced by the magnet.

26. The seat belt tension sensing device of any one of claims 19 to 25 further comprising a seat belt pretensioner which is adapted to be attached directly or indirectly to a structural member of a vehicle and the seat belt pretensioner is attached to said seat belt tension sensor.

27. The seat belt tension sensing device of claim 26 wherein the seat belt buckle is attached to the seat belt tension sensor using a length of cable and the seat belt tension sensor is attached to a cable that is a component of the seat belt pretensioner.

28. The seat belt tension sensing device of claim 26 further comprising a microprocessor connected by wire to said means for detecting and transmitting information about magnetic field strength, said microprocessor determining if the pretensioner should be activated based upon the sensed seat belt tension.

29. The seat belt tension sensing device of any one of claims 19 to 25 further comprising a seat belt pretensioner which is adapted to be attached directly or indirectly to a structural member of a vehicle, the seat belt buckle being attached to a cable that is a component of the seat belt pretensioner and the seat belt tension sensor being attached to a component of the seat belt pretensioner other than said cable.

* * * * *